Jan. 10, 1950 M. B. HERBRICK 2,493,760
TIRE CHAIN RELEASE DEVICE
Filed May 11, 1948 2 Sheets-Sheet 1

INVENTOR.
Milton B. Herbrick
BY
*Sam J. Slotsky*
ATTORNEY

Jan. 10, 1950  M. B. HERBRICK  2,493,760
TIRE CHAIN RELEASE DEVICE

Filed May 11, 1948  2 Sheets-Sheet 2

INVENTOR.
Milton B. Herbrick
BY
*Sam J. Slotsky*
ATTORNEY

Patented Jan. 10, 1950

2,493,760

UNITED STATES PATENT OFFICE 2,493,760

TIRE CHAIN RELEASE DEVICE

Milton B. Herbrick, Sterling, Colo.

Application May 11, 1948, Serial No. 26,469

5 Claims. (Cl. 152—213)

The invention relates to tire chain devices and is a continuation of and substitution for co-pending application Serial No. 653,072, filed March 8, 1946, for "Tire chain release device" and co-pending application Serial No. 7,148, filed February 9, 1948, for "Tire chain release device," each of which has been abandoned.

An object of my invention is to provide a release device, which will allow a tire chain to be released from a tire, and whereby the inner side chain can be removed at a fairly remote distance, so that the operator need not kneel on the ground, or reach behind the tire.

A further object of my invention is to provide means for releasing the inner chain in a simple arrangement which requires very few extra parts and which can use the end cross chain for the releasing function.

A further object of my invention is to provide a device having the above characteristics which can be readily attached, or detached as stated.

A further object of my invention is to provide modifications of the arrangement, which modifications, however, incorporate similar principles, and to provide structures which can be manufactured at a reasonable cost.

With these and other objects in view, my invention consists in the construction, arrangement, and combination of the various parts of my device, whereby the objects contemplated are attained, as hereinafter more fully set forth, pointed out in my claims, and illustrated in the accompany drawings, in which:

Figure 1:
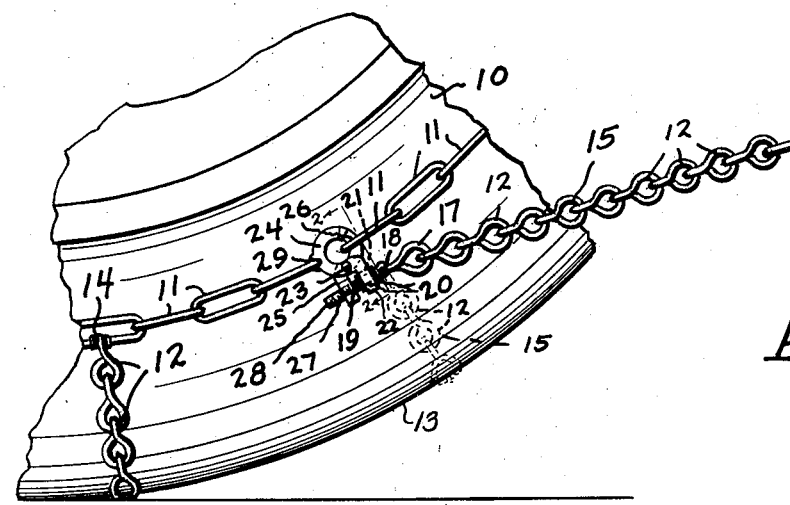
Figure 1 is a side elevation of one form of the releasing device as observed from the inside of the tire.

My invention contemplates a simple arrangement for detaching the inner, annular side chain of a tire chain arrangement, and whereby the operator need not become unduly soiled and the like, since the operator can release the side chain without touching any portion of the side chain itself, one of the cross chains assisting in manipulating a release clamp to provide the above mentioned function.

I have used the character 10 to designate the inner side wall of a tire casing, or the side which is facing away from the outside of the vehicle. I have further used the character 11 to designate a series of chain links which provide the inner side chain of the chain arrangement, and I have used the character 12 to designate the usual cross links which straddle the tire 13, such cross links being attached at 14 to either side, it being understood that a further series of links 11 are positioned on the outside of the tire. I have further used the character 15 to designate the end cross chains including the aforesaid twisted links 12 and which is attached to a ring 16, which ring is attached to the usual clamps on the outside of the tire, and which clamps are attached to the end links 11 of the outside chain. This construction is well known in the art and need not be illustrated herein. The end cross chain 15 during use will occupy the dotted portion shown in Figure 1 and its end member 16 will be attached as explained above.

The end link 17 of the cross chain is pivotally secured at 18 to a stud 19 which includes the collars 20, and which stud is received through an enlarged opening 21 in a prong 22 which prong 22 is pivoted at 23 and which continues into a jaw portion 24 which is substantially semi-circular. A further prong 25 is pivoted at 23 to the portions 22 and 24, and continues into a further jaw 26, the jaws 24 and 26 passing each other slightly when engaged. The prong 25 is threaded at 27, and threadably engages the threads 28, which threads 28 are provided on the stud 19.

One end link 11 is received over the jaw 26, and the further end link is pivotally secured at 29 to the further jaw 24.

Figure 2:
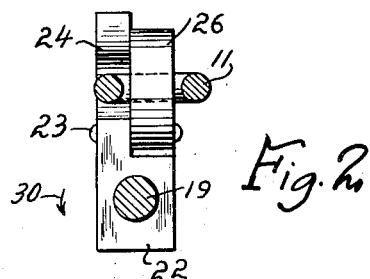
Figure 2 is a sectional detail taken along the lines 2—2 of Figure 1.

When using the device, the jaws are in closed position and with the end links 11 engaged as shown in Figure 1, and with the end cross chain 15 being positioned about the tire as shown by the dotted lines. The firm engagement of the cross chain with its attached clamps, etc., will prevent rotation of the stud 19 and will maintain all of the parts in a secure manner. When it is desired to release the entire chain, first the member 16 is detached from the clamps on the outside of the tire, and next the cross chain 15 is held in approximately the position shown in Figure 1, and whereby it will not be necessary for the operator to kneel on the ground or reach behind the tire. The ring 16 is then rotated, or as shown by the arrow 30 in Figure 2, which rotation rotates the chain 15 and the stud 19, and as the threaded portion 28 of the stud is turned within the prong 25, the prongs 25 and 22 will separate thereby opening the jaws 24 and 26 until the end link 11 which had been engaged with the jar 26 will be released, which action can be expedited by gently shaking the chain 15, etc. The opening 21 is made sufficiently large with respect to the stud in order to allow for the different angular positions of the stud as the prongs separate. The junction point of the jaws is made close to the link 11 so that the jaw will separate therefrom quite readily. This operation fill then release the inner side chain.

Figure 3:
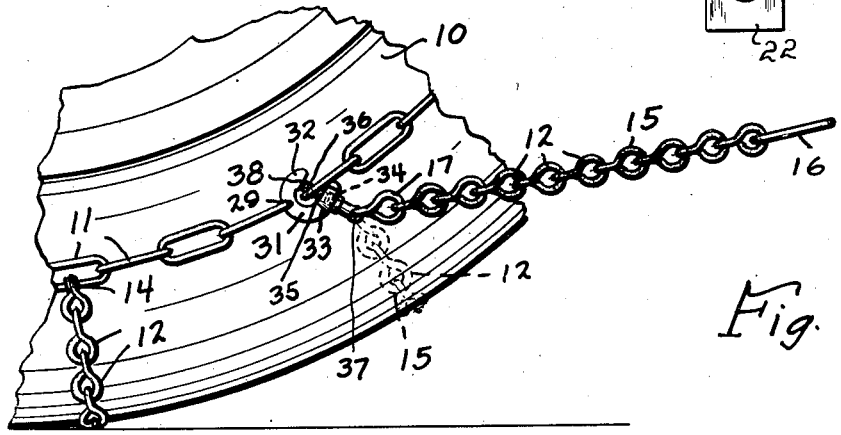
Figure 3 is a side elevation of a further form of the releasing device.

Figure 3 illustrates a modified form of the arrangement with the exception that a jaw member 31 is used which includes an upper jaw portion 32 and a lower jaw portion 33 having the threaded opening 34 threadably engaging the threads 35 of a stud 36 to which is pivotally attached at 37 an end link 17 of the same cross chain 15. The end 38 of the stud 36 is securely seated against the jaw 32 when the chains are attached, and when it is desired to detach the inner chain, the ring 16 is rotated in the manner above described, which rotates the stud 36 carrying the end of the stud downwardly which allows release of the end link 11.

It will be seen that both structures explained herein are substantially alike in principle in that they will release through turning action of the cross chain, and it should also be specifically understood that other types of threaded or other arrangement could be used without however departing from this above mentioned principle. It will now be seen that I have provided the various advantages mentioned in the objects of my invention with other advantages being readily apparent.

Figure 4:
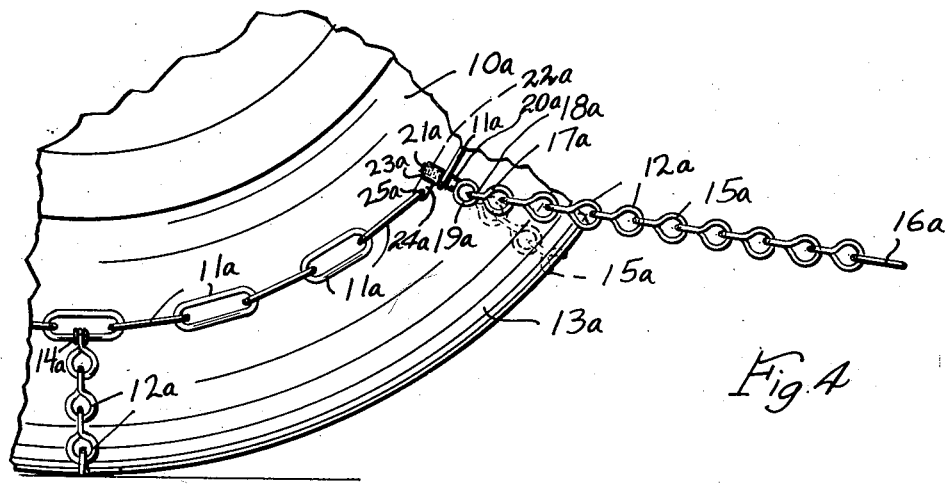
Figure 4 is a side elevation of a releasing device as observed from the inside of the tire and illustrating still another form of the invention.
Figure 5:
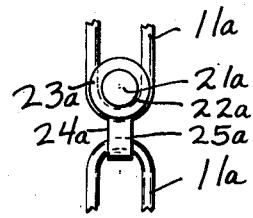
Figure 5 is an enlarged detail plan view of a portion of the chain release device.

In Figures 4 and 5 is illustrated a further modification and I have used the character 10a to designate the inner side wall of a tire casing, or the side which is facing away from the outside of the vehicle. I have further used the character 11a to designate a series of chain links which provide the inner side chain of the chain arrangement, and I have used the character 12a to designate the usual cross links which straddle the tire 13a, such cross links being attached at 14a to either side, it being understood that a further series of links 11a are positioned on the outside of the tire. I have further used the character 15a to designate the end cross chain including the aforesaid twisted links 12a and which is attached to a ring or suitable clamp 16a, which member 16a is attached to the links on the outside of the tire in the usual manner. This construction is well-known in the art and need not be illustrated herein. The end cross chain 15a during use will occupy the dotted position shown in Figure 4 and its end member 16a will be attached as explained above. The end link 17a of the cross chain is attached at 18a to a small ring 19a which ring 19a is an integral extension of the portion 20a, and integrally extending from the portion 20a is a threaded stud 21a which is threadably engaged at 22a within a further circular member 23a. Extending from the member 23a is the further ear 24a which is attached at 25a to one of the end links 11a. The further end link 11a at the right hand side of Figure 4 receives the stud 21a.

When the cross chain 15a is in position as shown by the dotted lines, the inner, annular series of links 11a will be held securely as shown. When it is desired to release the entire chain, first the member 16a is detached from the links 11a on the outside of the tire, and next, the cross chain 15a is held in approximately the position shown in Figure 4, and whereby it will not be necessary for the operator to kneel on the ground or reach behind the tire. The member 16a is then rotated, which rotation rotates the chain 15a and the stud 21a, until the stud 21a is removed from the member 23a. This will then release the right hand link 11a, whereby the entire chain can then be readily removed.

It will now be seen that I have provided the various advantages set forth in the objects of my invention with various other advantages being readily apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A tire chain release device including an inner side chain divided and forming two end portions, a cross chain, a member connected to one end portion of the inner side chain and having a threaded opening, and a stud connected to the cross chain and engaging one of the links of the other end portion of said side chain and having a threaded engagement with said member and rotatable by the cross chain to engage and release said link for connecting and disconnecting the two end portions of the inner side chain.

2. A tire chain release device including an inner side chain divided and forming two end portions, a cross chain, a member connected to one end portion of the inner side chain and having a threaded opening, and a stud connected to the cross chain and extending through one of the links of the other end portion of said side chain and having a threaded engagement with said member and rotatable by the cross chain to engage and release said link for connecting and disconnecting the two end portions of the inner side chain.

3. A tire chain release device including an inner side chain divided and forming two end portions, a cross chain, and clamp means including a clamp member connected to one end portion of the inner side chain and provided with a recess receiving a link of the other end portion of the side chain and a threaded stud connected with the cross chain and having threaded engagement with the clamp member at one side of the recess and extending across same and engaging and confining said link therein, whereby rotation of the cross chain about its longitudinal axis will cause said clamp means to release said link and said inner side chain from a tire.

4. In combination with a tire chain having inner and outer side chain portions and cross chains, clamp means for holding said inner side chain portions together, one of said tire cross chains being attached to said clamp means whereby rotation of the cross chain about its longitudinal axis will cause said clamp means to release said inner chain portion, said clamp means including a pair of pivoted jaws, end links of said inner chain portion engaging the jaws, a threaded stud engaging an extremity of one of said jaws, said cross chain being attached to said stud whereby rotation of the cross chain will cause said jaws to open, releasing an end link of the side chain portion.

5. A tire chain release device including an inner side chain divided and forming two end portions, a cross chain, a threaded member connected to one end portion of the inner side chain, a stud threadably engaged with said member received within a link of the other end portion of the side chain, whereby rotation of the cross chain about its longitudinal axis will cause said stud to release said link and said inner side chain from a tire.

MILTON B. HERBRICK.

No references cited.